United States Patent [19]

Kowal

[11] Patent Number: 4,721,593

[45] Date of Patent: Jan. 26, 1988

[54] PROCESS FOR MOLDING AND CURING A COMPOSITE SKIN-STIFFENERS ASSEMBLY

[75] Inventor: William Kowal, St. Leonard, Canada

[73] Assignee: Canadair Inc., Montréal, Canada

[21] Appl. No.: 863,369

[22] Filed: May 15, 1986

[51] Int. Cl.⁴ .................. B29C 43/10; B29C 43/20
[52] U.S. Cl. .................. 264/258; 264/314; 264/505; 264/512; 264/516; 156/156
[58] Field of Search ............. 264/314, 258, 512, 516, 264/544, 505; 156/156, 219, 227

[56] References Cited

U.S. PATENT DOCUMENTS

| | | | |
|---|---|---|---|
| 2,451,131 | 10/1948 | Vidal et al. | 264/314 |
| 3,135,640 | 6/1964 | Kepka et al. | 264/512 |
| 3,270,111 | 8/1966 | Haldemann | 264/314 |
| 3,493,240 | 2/1970 | Jenks | 264/512 |
| 3,641,230 | 2/1972 | Jenks | 264/314 |
| 3,764,431 | 10/1973 | Kramer et al. | 156/156 |

Primary Examiner—Jan H. Silbaugh
Assistant Examiner—J. F. Durkin, II

[57] ABSTRACT

A process using molds for curing a composite skin-stiffeners assembly from fiber material impregnated with a resin. This process allows molding and co-curing of single-skin type panels with integral stiffeners, allows stiffeners of variable heights, thicknesses and widths, allows substantial freedom in the layout of stiffeners, and allows even integral cross-stiffeners. Bonding and mechanical fasteners are also dispensed with. This process is further characterized by providing a stiffener forming mold part having a corrugated face, laying composite material over the ridges defined by the corrugated face to form stiffeners of open cross-sectional shape and interspacing gaps between them in bonding contact with skin forming material, and co-curing of the skin-stiffeners assembly.

8 Claims, 7 Drawing Figures

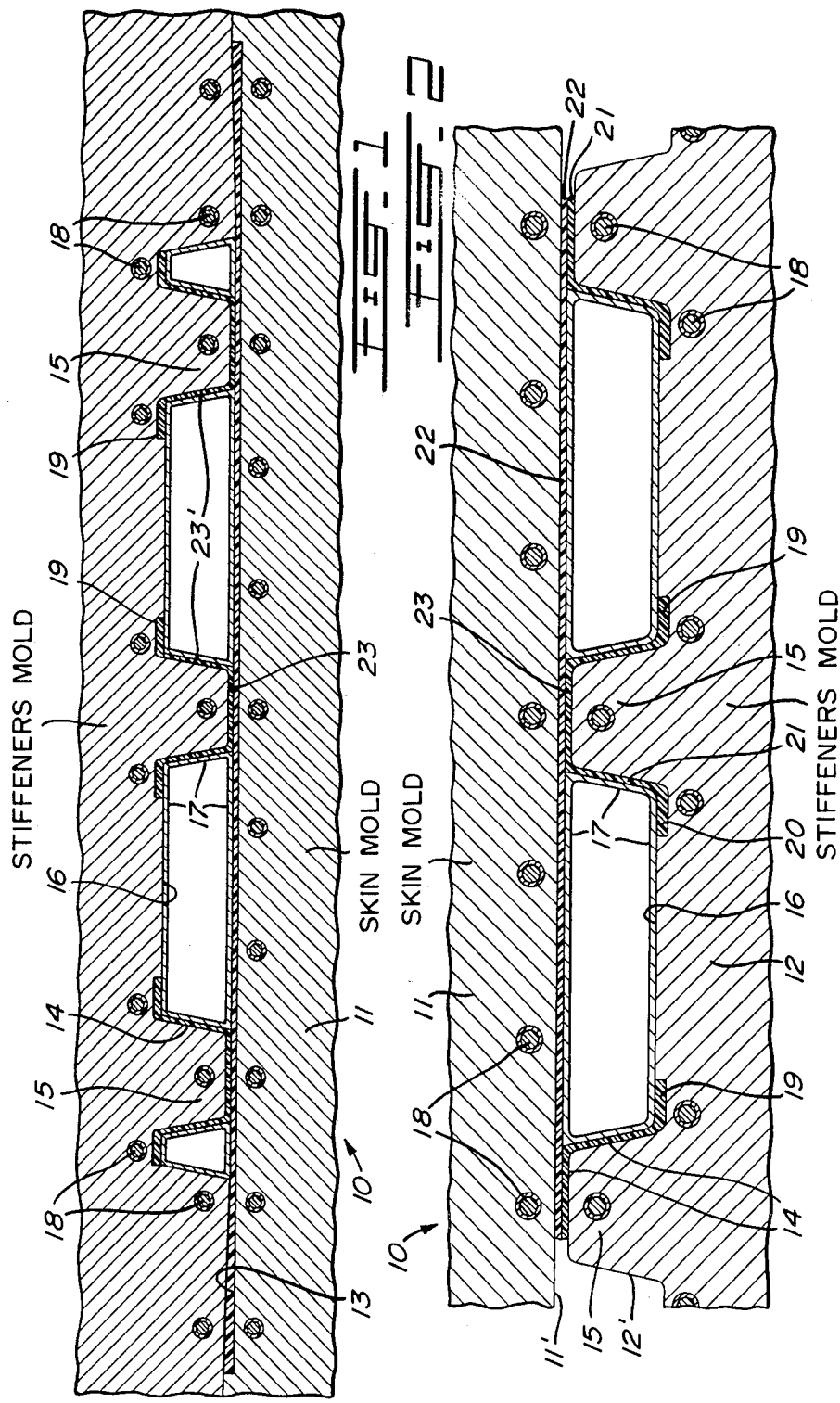

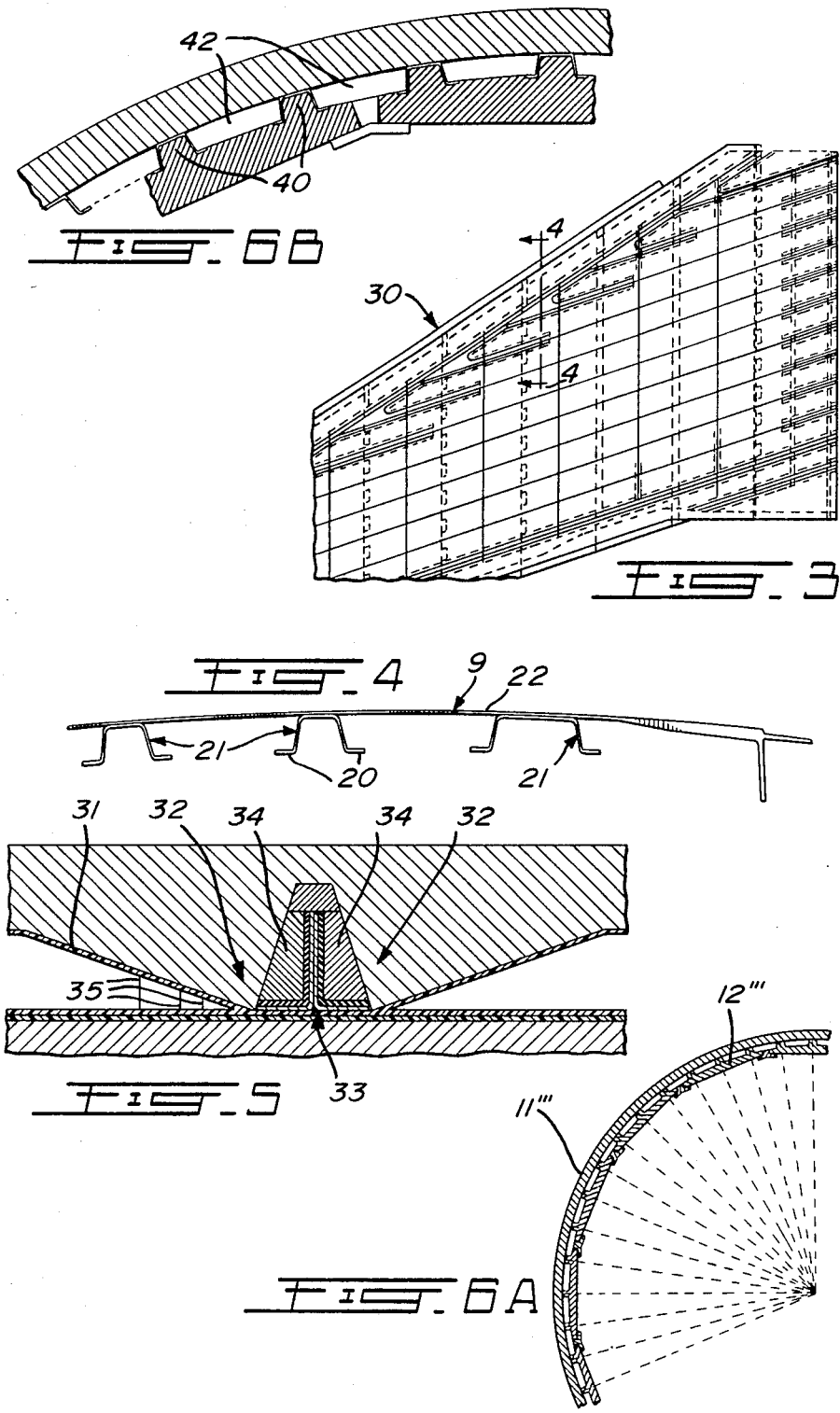

PROCESS FOR MOLDING AND CURING A COMPOSITE SKIN-STIFFENERS ASSEMBLY

BACKGROUND OF THE INVENTION

1. Field of the Invention

The present invention relates to a novel process providing molds for integral co-curing of a composite assembly made of a skin and stiffeners.

2. Description of Prior Art

There is a trend to increase the use of so-called composite material in the manufacture of aircraft parts. Such composite material is usually constituted by interwoven fabrics formed of reinforcing fibers, and of unidirectional fiber materials, such as fiberglass, graphite, boron, etc., and impregnated with epoxy resins. An advantage in the use of such materials is that they eliminate a great many mechanical fasteners such as rivets utilized in attaching the usual metal panels to the framework while providing a strong and light structure. A typical example of the use of such skins is disclosed in U.S. Pat. No. 4,395,450 issued on July 26, 1983 to the Boeing Company. However, this patent is concerned with the construction of structural elements having reinforcing cores disposed between cross-skin panels.

SUMMARY OF INVENTION

The present invention is concerned with a process and related molds for the fabrication of a structure of single-skin type, such as a panel, having stiffeners integrally cured therewith. These stiffeners are usually formed with lateral flanges to stiffen the skin and for securing the skin to support framework. Because of the disposition of these lateral flanges, it has not been heretofore easy to mold the skin and the stiffeners integrally as the composite molded part could not be extracted from conventional molds. Therefore, it is the practice to fabricate the skin and stiffeners separately and then to secure the stiffeners to the skin by the use of adhesive generally under heat and pressure. Fasteners are also utilized to secure these stiffeners to the skin.

Another fabrication method is to use expensive composite molds to retain the skin and stiffeners in position in an autoclave for co-curing the stiffeners and skin together. However, such molds have been found to be quite expensive and bulky and difficult to handle and further require special autoclaves capable of housing such molds.

It is a feature of the present invention to provide a novel process using molds for co-curing a composite skin stiffener assembly with the skin and stiffeners made of reinforced fibrous material impregnated in a resinous substance.

Another feature of the present invention is to provide a novel process for integral co-curing of a composite skin-stiffener assembly made of fibrous material and resin that allows improved heating and co-curing without an autoclave.

Another feature of the present invention is to provide a process and a molding apparatus to integrally cure a skin and siffeners together and to thereby avoid bonding and mechanical fasteners to join the same.

Another feature of the present invention is to provide a process and a molding apparatus to integrally co-cure a skin to structural of open cross section with interspacing gaps between them, thus allowing access to the structural components for easy inspection and repair.

Another feature of the present invention is that the novel process and molding apparatus produce smooth internal surfaces as well as smooth external surfaces by laying and curing all the composite material in pressed engagement, at least on one side against a corresponding curing face of the mold.

Another feature of the present invention is to provide a process using molds for curing a composite skin-stiffeners assembly of single-skin type wherein the pieces of composite material are held in position under pressure by inflatable molding devices disposed inside mold enclosures in registry with interspacing gaps between the stiffener forming material thereby allowing removal of the inflatable molding devices by lifting the same away through the interspacing gaps.

According to the above features, from a broad aspect, the present invention provides a molding process for curing a composite skin-stiffeners assembly of single-skin type comprising the steps of providing a stiffener mold part having at least one stiffener shaping ridge and a valley formed thereagainst on a corrugated curing face of the mold. Composite material laminae are laid over the corrugated curing face in stiffener shape of open cross section. An expandable molding device is provided in the valley adjacent the ridge of the stiffener mold part having the laminae of composite material laid thereon. A skin of composite material is also laid over the curing face of the skin mold part. The curing face of the skin mold part and stiffener mold part are then juxtaposed defining one or more mold enclosures with at least a portion of the skin of the skin mold part in contact with at least a portion of the composite material over the ridge. The expandable molding device is then expanded to apply pressure against the skin and the composite material on the ridge and retains them in position. The composite material of the skin and stiffeners is then co-cured under appropriate heat and pressure. The expandible molding device is removed after curing by lifting thereof through a corresponding interspacing gap provided between the pieces of composite material laid over the adjacent ridges.

According to a further broad aspect of the present invention, the mold parts are provided with heating medium embedded therein whereby to supply the appropriate heat to the composite material of the skin and stiffeners.

According to another feature of the present invention, there is provided a mold for co-curing a composite stiffeners assembly. The mold comprises a skin mold part having a skin receiving curing face. A stiffener mold part is also provided and has a curing face including at least one stiffener shaping ridge and valleys on the opposite sides of each ridge. The mold parts are operatively held with the curing faces juxtaposed. An expandable molding device is disposed in each valley whereby to press the composite material of the skin against the curing face of the skin mold part and against the ridge of the stiffener mold part during a heat curing cycle.

BRIEF DESCRIPTION OF DRAWINGS

A preferred embodiment of the present invention will now be desribed with reference to the examples thereof as illustrated in the accompanying drawings, in which:

FIG. 1 is a cross-section view illustrating the construction of a mold for co-curing a composite skin-stiffeners assembly in accordance with the process of the present invention;

FIG. 2 is a further enlarged cross-section view showing the composite laminae laid on the mold parts;

FIG. 3 is a plan view of a section of an aircraft wing constructed with the composite skin-stiffeners assembly according to the present invention;

FIG. 4 is a section view along section lines 4—4 of FIG. 3;

FIG. 5 is a fragmented section view of a composite skin-stiffeners assembly showing the passage of a cross-rib over a stiffener in an appropriate molding apparatus.

FIG. 6A is a fragmented section view of a cylindrical mold utilized for the molding of the composite skin-stiffeners assembly for use in the construction of a fuselage; and FIG. 6B is an enlarged view of a portion of FIG. 6A.

DESCRIPTION OF PREFERRED EMBODIMENTS

Referring now to the drawings and more particularly to FIGS. 1 and 2, there is shown generally at 10, the construction of a molding apparatus in accordance with the present invention for co-curing a composite skin-stiffeners aassembly such as shown at 9 in FIG. 4. The molding apparatus comprises essentially a skin mold part 11 and a stiffener mold part 12. Both of these mold parts are provided with curing faces 11' and 12'. The mold parts may be secured to one another by conventional attachment means such as hinges, etc. (not shown) whereby to juxtapose the curing faces 11' and 12'.

As shown more clearly in FIG. 1, the skin mold part 11 has a skin receiving cavity 13 formed in the curing face 11' thereof. This skin receiving cavity is a shallow elongated flat cavity to retain laminae of fibrous material impregnated with a resin thereon.

The stiffener mold part 12 is provided in its curing face 12' with stiffener shaping ridges 14 and 15 machined or otherwise formed in the stiffener mold curing face. The ridges 14 and 15 have a flat top face 23 and side walls 23' which are angulated toward the top wall 23 to define a substantially inverted trough-shaped section whereby to facilitate the extraction of the cured composite skin-stiffeners assembly. A cavity 16 is defined between the ridges 14, 15 for receiving therein an expandable molding device herein in the form of an inflatable membrane 17. This membrane is usually shaped to expand to press against each of the surrounding walls of the valley 16 and the opposed skin portion thereagainst when the mold parts are closed.

In order to apply heat to specified surrounding areas of the mold cavities and to the skins, there is disposed within each of the mold parts 11 and 12 heating tubes or elements 18. The heating medium may be constituted by embedded electrical resistive elements or else by conduits through which a heating fluid is circulated. These elements or tubes are disposed in areas where the fiber resin-impregnated material is to be co-cured. That could be provided by heating the entire curing surface of the mold.

In the embodiment shown in FIGS. 1 and 2, it can be seen that a flat recess 19 is disposed in the valley 16 and in a portion adjacent each of the ridges 14 whereby to mold a stiffener flange 20.

The operation of this molding apparatus or the process carried out thereby consists in laying strips or laminae of composite material over the stiffener shaping ridges 14 and into the recess 19. A skin of like composite material is also disposed in the skin receiving cavity 13 of the skin mold part 11 and retained thereon by its tackiness or by gravity or other suitable means such as suction, etc. The inflatable molding device 17 is then disposed in the valley 16 and thus within the mold enclosures formed by juxtaposing the curing faces of the mold parts. Air pressure is then applied to the inflatable molding device by a pump (not shown). This air pressure applies the inflatable membrane against the composite material retaining them in position and under required pressure. Heat and external pressure are then applied to the mold parts to maintain equal pressure from all sides. During the co-curing of the stiffener ridges 21 and the skin 22, the portions where the composite material are in contact, such as in the flat top face 23 of the ridges 15 and the adjacent face of the skin mold part, will mold together and interconnect as a solid part due to the curing of the resin under temperature and pressure in that region. The heat and internal and external pressure are applied for a predetermined time as specified by a cure cycle for the composite material used, after which time the mold is cooled down, opened, and the reusable inflatable membranes 17 are deflated and removed through the space intermediate the free edges of the lateral stiffening attachment flanges 20.

FIG. 4 illustrates a product formed with a mold by a process of the type described with reference to FIGS. 1 and 2. As herein shown, the article is utilized in the construction of an aircraft wing 30 as illustrated in Figure 3. FIG. 4 is a section view through section lines 4—4 of the wing of FIG. 3. It can be seen that with this type of wing construction, the outer surface of the wing is substantially free of fasteners.

Referring now to FIG. 5, there is shown a typical modification that can be made to the composite skin-stiffeners assembly. In this particular embodiment, there is shown a stiffener 31 having formed therein a passage 32 for the attachment of a cross-rib 33 extending transversely thereacross. This transverse rib is herein shown as being an inverted T-shaped rib also formed of composite material and having mold pressure pads 34 on each side thereof. In this particular embodiment, it is also seen that the stiffener ridges are formed of decreasing height at their locations 35 in the passage area 32. Various other modifications are, of course, possible.

FIGS. 6A and 6B illustrate another configuration of the mold parts 11''' and 12'''. As hereinshown, the skin mold part 11''' is cylindrical in shape and may be formed in sections. The stiffener mold part 12''' is formed of a plurality of mold sections having ridges 40 which are laterally spaced apart. Inflatable molding devices are inserted in each of the mold enclosures 42 defined between the ridges 40. Such molds are utilized in the construction of a tubular aircraft fuselage.

Although the mold parts 11 and 12 as herein described are provided with heating means embedded therein, it is also possible to insert these molds within an autoclave to effect the heating and the required pressure for a cure cycle. However, it is much more economical to provide the heating means in the manner described herein, as the curing can be done at the same location where the fabric is laid within the mold. With the particular process and related molds as above described, it can also be seen that the stiffeners can be of different sizes, thicknesses or widths and can be shaped as required. They do not have to extend parallel to one another and thus allow substantial freedom of layout. No trimming of the skin or stiffeners is required after the curing, and flat or contoured structures can be molded. Cross-ribs could also be incorporated in the co-curing and mechanical fasteners and secondary adhesive bonding is dispensed with as a result of the integral co-curing of the skin and stiffeners. It is also possible to manufacture complete bodies for the construction of the various aircraft part or parts not necessarily restricted to the construction of aircraft, such as floor structures, walls, ceilings, etc.

It is within the ambit of the present invention to cover any obvious modifications of the examples of the preferred embodiments described herein provided such modifications fall within the scope of the appended claims.

I claim:

1. A process for molding and curing a composite skin-stiffeners assembly of the single-skin type, comprising the steps of:
   (i) providing a stiffener mold part having a corrugated curing face formed with at least one stiffener-shaping ridge and valleys formed on the opposite sides of each ridge;
   (ii) laying a piece of stiffener forming composite material in stiffener shape of open cross-section over each ridge against the opposite sides thereof to form a stiffener upon each said ridge with interspacing gaps between the laid pieces of stiffener forming composite material;
   (iii) placing an expandable molding device in each valley formed by the corrugated curing face of the stiffener mold part and over the gaps between the laid pieces of stiffener forming material;
   (iv) laying a skin of composite material over a skin curing face of a skin mold part;
   (v) positioning the skin curing face of the skin mold part and the corrugated stiffener curing face of the stiffener mold part in face to face juxtaposition, with said valleys defining longitudinal mold enclosures along each side of each ridge, with at least a portion of the skin material on the skin mold part coming in molding contact with at least a portion of each piece of the stiffener forming composite material laid over each ridge;
   (vi) expanding said expandable molding devices to apply appropriate molding pressure against the skin material and the stiffener forming composite material extending into the mold enclosures to press the same in position against the corresponding curing face; and
   (vii) co-curing said skin and stiffener composite material under appropriate heat and pressure.

2. A process as claimed in claim 1 wherein there are a plurality of shaping ridges and valleys formed by the corrugated curing face of the stiffener mold part and wherein said step (ii) comprises placing an inflatable membrane in each valley of the longitudinal mold enclosures and applying air pressure to said membrane.

3. A process as claimed in claim 2 wherein said ridges are elongated ridges, said step (i) comprises laying composite material strips lengthwise over a portion of said shaping ridges and an adjoining valley portion, said strip extending along said valley portions defining lateral flanges spaced from the skin material.

4. A process as claimed in claim 3 including forming the valleys with a flat recess and laying said strips of material down over said flat recesses to form said lateral flanges.

5. A process as claimed in claim 1, 2 or 3, including laying up the strips of material over inverted trough-shaped ridges.

6. A process as claimed in claim 1 including forming the ridge configuration with a flat top portion to define the contact portions with flat face engagement with the skin material.

7. A process as claimed in claim 1 including shaping portions of said ridges in diminished height to define transverse cross-rib passages, and laying cross-ribs transversely over the diminished height portions through the cross-rib passages, and integrally co-curing said cross-ribs with said skin and said stiffeners, in bonding contact with the stiffener forming material.

8. A process as claimed in claim 1 wherein said step (vii) comprises providing heating elements in said stiffener mold part and skin mold part whereby to apply controlled heat to effect said co-curing.

* * * * *